Patented Mar. 9, 1954

2,671,750

UNITED STATES PATENT OFFICE 2,671,750

STABLE NONCAKING AQUEOUS SUSPENSION OF CORTISONE ACETATE AND METHOD OF PREPARING THE SAME

Thomas J. Macek, Irvington, N. J., assignor to Merck & Co., Inc., Rahway, N. J., a corporation of New Jersey No Drawing. Application September 19, 1950, Serial No. 185,685

7 Claims. (Cl. 167—77)

This invention is concerned generally with stable pharmaceutical formulations of steroid substances and with processes for preparing the same. More particularly, it relates to improved suspensions of the steroid substance, cortisone acetate (also known as 11-dehydro-17-hydroxy-corticosterone acetate) in aqueous vehicles, said suspensions being stable and non-caking on storage and adapted for parenteral administration, and to processes for preparing such suspensions by contacting cortisone acetate with said aqueous vehicles and grinding the resulting mixtures.

Previous attempts to prepare a stable aqueous suspension of cortisone acetate suitable for use in the treatment of disease by hypodermic injection have been unsuccessful. When cortisone acetate, in the form of crystals that are stable in the dry state, was suspended in an aqueous medium and allowed to remain in the medium for a few hours, it was observed that crystal growth of the cortisone acetate invariably occurred with subsequent caking and sedimentation. This invariably occurred to such a great extent that a suspension could no longer be prepared by shaking the mixture. The physical properties of the suspension were altered to a degree that made it entirely unsatisfactory for medicinal use by parenteral administration.

From the previously known characteristics of cortisone acetate, there was no reason to expect that changes would take place in physical properties of the suspensions, and the fact that these changes in physical properties are related to the crystal form of the cortisone acetate was discovered only after considerable experimentation and loss of valuable material. These experiments led to the discovery that it is impracticable to prepare a dry crystalline form of cortisone acetate which will not change when introduced from the dry state into an aqueous medium.

I have discovered that the caking observed when it is attempted to prepare an aqueous suspension starting with dry crystalline forms of cortisone acetate is due to the fact that these crystal forms of cortisone acetate are unstable in the presence of an aqueous medium, and that a change in crystal form of the cortisone acetate to a more stable variety is responsible for the caking of the suspension. I have further discovered that it is possible to prepare a stable, non-caking aqueous suspension of cortisone acetate by bringing the dry crystalline material (containing crystals unstable in the presence of water) into contact with the aqueous vehicle and subjecting the mixture to a grinding operation, whereby a simultaneous conversion of the unstable crystalline cortisone acetate to a stable crystal form takes place accompanied by reduction in particle size of the stable crystals thus produced.

Cortisone acetate has been found to occur in at least 4 different crystalline forms which may be characterized by various physical methods such as, for example, X-ray analysis. The X-ray data by which it is possible to distinguish one form from another, are as follows:

*Form 1.*—Most common and probably most stable form at room temperature.

| Interplanar Spacing, Å. | $2\theta$ (CuK$\alpha$), degrees |
|---|---|
| 13.6 | 6.5 |
|  | 13.0 |
|  | 15.2 |
|  | 15.9 |
| 6.80 |  |
| 5.82 |  |
| 5.56 |  |
| 5.14 |  |
| 4.92 | 19.7 |
| 4.50 | 20.4 |
| 4.35 |  |
| 4.21 |  |
| 3.88 |  |

*Form 2.*—Occasionally formed on crystallization from solvents with little tendency to solvation.

| Interplanar Spacing, Å. | $2\theta$ (CuK$\alpha$), degrees |
|---|---|
| 10.8 |  |
| 7.7 | 16.4 |
| 5.40 |  |
| 4.92 |  |
| 4.02 |  |
| 3.68 |  |

*Form 3.*—Occasionally formed when form 5 is dried above room temperature.

| Interplanar Spacing, Å. | $2\theta$ (CuK$\alpha$), degrees |
|---|---|
| 13.6 | 6.5 |
| 8.8 |  |
| 7.8 |  |
| 6.7 | 14.4 |
| 6.14 |  |
| 5.84 | 16.7 |
| 5.30 | 18.8 |
| 4.71 | 20.0 |
| 4.44 | 23.1 |
| 3.84 |  |

Form 5.—Stable in aqueous suspension at room temperature.

| Interplanar Spacing, Å | $2\theta$ (CuK$\alpha$), degrees |
|---|---|
| 15.5 | 5.7–6.0 |
| 8.65 | 14.9–15.1 |
| 5.94 | 15.7–15.9 |
| 5.65 | 17.7–18.0 |
| 5.01 | |
| 4.78 | |
| 4.68 | |
| 4.41 | |
| 4.15 | |
| 4.09 | |
| 3.95 | |
| 3.82 | |

These X-ray data were obtained by the powder method using a Norelco X-ray spectrometer and using copper K$\alpha_1\alpha_2$ radiation. The observed angle, $2\theta$, is commonly used without conversion to interplanar spacing and values of this angle are reported for the major peaks useful for characterization. The use of wet slides, necessitated by the rapid change of crystal form 5 on drying, introduced the indicated range of variation in the observed angle.

As set forth hereinabove, I have found that form 5 of cortisone acetate is stable in aqueous suspension at room temperature and that the other crystalline forms, while stable under certain conditions, are unstable in the presence of aqueous media and may be converted to form 5 by being brought into contact with an aqueous medium. In carrying out this process for the preparation of stable aqueous suspensions, it is essential that the process be carried out under controlled conditions and in such a manner as not to adversely affect the physical properties of the completed suspensions nor otherwise limit its quality and usefulness, and that the process be conducted under sterile conditions, since the suspensions are intended for parenteral administration.

It is ordinarily preferred to carry out the present process by milling together a mixture containing cortisone acetate existing in a crystalline form unstable in contact with aqueous vehicles, and an aqueous vehicle under such conditions that there is a continual reduction in particle size and a simultaneous conversion of the less stable form into the more stable variety. The net result of this procedure is a change in the suspension to a stable state without crystal growth and without cementation or caking of the solid. The milling is preferably accomplished using a mixture comprising between 5 parts of cortisone acetate to 95 parts of aqueous vehicle, and 15 parts of cortisone acetate to 85 parts of aqueous vehicle. The milling is conveniently conducted using a hard glass mill such as a 6 liter Pyrex bacteria grinding jar using a quantity of glass rods or glass beads as the grinding medium. The mill, charged with steroid compound, aqueous vehicle and rods or beads, is rotated on its side on rollers, preferably at a rate of approximately 25 to 45 revolutions per minute. The milling operation is preferably carried out at a temperature of approximately 20° C.

Although not essential to the successful performance of this invention, it is ordinarily preferred to "seed" the mixture before milling by the addition of a small quantity, as for example 0.5 cc., of a suspension containing the stable crystalline form 5 of the cortisone acetate, since this latter step serves to accelerate the conversion of the unstable crystal form to the stable form 5. Once the conversion to the stable crystalline form has taken place and the particle size has been reduced by milling to a suitable range, the primary mixture can be diluted without change in the crystalline form, caking or sedimentation. The preferred range to which the particle size is reduced is between 0 and 10 microns in length with not more than 10% of the total number of particles exceeding 10 microns, all of the particles being smaller than 50 microns in length.

It is ordinarily preferred to employ an isotonic aqueous vehicle containing a surface active agent, a suspending agent, and a bacteriological preservative. Actually, it is possible to prepare a stable, non-caking aqueous suspension of cortisone acetate without using these additional components in the aqueous vehicle, since the only prerequisite for stability for such suspensions is that the cortisone acetate exist in crystal form 5. Such suspensions (not containing said additional components) have, however, been found to settle rapidly, so much so that it would be impracticable to draw a suitable dosage before this settling occurred. The surface active agent, which functions to prevent the individual particles from coalescing, and the suspending agent, which increases the viscosity of the vehicle and thereby prevents rapid settling, are therefore important in the preparation of a practicable suspension adapted for parenteral administration. Although the bacteriological preservative has no effect on the stability of the suspension, a preservative such as benzyl alcohol, phenol, and the like, is required in a multiple-dosage container to maintain sterility during actual use. It is not necessary for stability that the suspension be isotonic, but such isotonic suspensions are ordinarily preferred in order to minimize irritation on injection. The suspension is ordinarily rendered isotonic by the addition thereto of sodium chloride.

As surface active agents, I ordinarily utilize a polyoxyalkylene derivative of sorbitol anhydride long chain fatty acid ester as for example, the polyoxyalkylene derivative of sorbitan monooleate (commercially available under the name "Tween 80" manufactured by the Atlas Powder Co., Wilmington, Delaware), and the like, as well as other surface active agents such as sodium lauryl sulfate, cetyl trimethyl ammonium bromide, benzalkonium chloride, and the like.

As the suspending agent, I prefer to employ sodium carboxy methylcellulose, methyl cellulose, gelatin, sodium alginate, and the like.

The following examples illustrate methods of carrying out the present invention, but it is to be understood that these examples are given for purposes of illustration and not of limitation:

*Example 1*

Two sterile aqueous vehicles, designated as A and B respectively and having the following compositions, were prepared:

| | Aqueous Vehicle | |
|---|---|---|
| | A | B |
| Tween 80 (Polyoxy alkylene-derivative of sorbitan monooleate) cc | 1.00 | |
| Sodium chloride gm | 0.72 | 0.72 |
| Sodium carboxymethylcellulose (Low viscosity) gm | 0.40 | 0.40 |
| Benzyl alcohol cc | 1.20 | 1.20 |
| Distilled water, to make cc | 80.00 | 80.00 |

6 gms. of sterile cortisone acetate which had been determined by X-ray analysis to have the unstable crystal form 2 as characterized hereinabove, was added to a 120 cc. Pyrex glass bottle approximately ⅓ full of solid 6 mm. Pyrex glass beads, which had previously been sterilized and dried. 80 cc. of sterile aqueous vehicle A was added to the cortisone acetate in the bottle and the bottle was aseptically sealed and was rolled on its side on mechanical rollers for a period of 18 hours. The milled primary mixture was aseptically separated from the beads by draining on a perforated plate of a sterile Büchner funnel. Sufficient sterile vehicle B was added to said primary mixture to make the total volume equal to 240 cc.

During the milling operation, the crystalline form of the cortisone acetate, as determined by X-ray analysis, was found to have changed from unstable form 2 to a stable variety (form 5). The particle size was found to be as follows:

0–10 microns_____ 52% by number
0–20 microns_____ 86% by number
0–50 microns_____ 100% by number The suspension after final dilution, was fluid, free of lumps and large crystals, and did not cake on standing. This suspension has been stored at room temperature for more than one year without change in crystal form or appearance.

Example 2

6 gms. of sterile cortisone acetate (unstable form 2) was added to a 120 cc. Pyrex glass bottle approximately ⅓ full of solid 6 mm. Pyrex glass beads, which had previously been sterilized and dried. 80 cc. of sterile aqueous vehicle A, having the composition set forth in Example 1 hereinabove, was added to the contents of the bottle. The bottle was then aseptically sealed and was rolled on its side for 15 hours. The milled mixture was then aseptically separated from the beads, utilizing the procedure described in Example 1. Sterile aqueous vehicle B, having the composition set forth in Example 1, was then aseptically added to the resulting primary mixture to bring the total volume up to 240 cc.

Particle size analysis of the resulting mixture indicated the following distribution:

0–5 microns equals 96% by number
0–20 microns equals 100% by number

The suspension was allowed to stand at room temperature overnight. In view of the fact that complete conversion of the unstable crystal form to a stable variety had failed to occur during the milling operation, there was caking in the bottle. Microscopic examination of the slurry demonstrated the presence of many elongated flat crystals and needles ranging between 75 and 200 microns in length. The caked material was broken up by extremely vigorous shaking and the resulting mixture aseptically transferred to a 120 cc. sterile Pyrex bottle approximately ⅓ full of 6 mm. sterile glass beads, and the mixture was remilled for an additional 12 hours. At the end of this milling period, the particle size distribution was as follows:

0–5 microns equals 88% by number
0–10 microns equals 99% by number
0–30 microns equals 100% by number After the second milling, the suspension was fluid, free of lumps and failed to cake on standing. This suspension has been stored at room temperature for more than 1 year without change in crystal structure (demonstrated by X-ray analysis to be crystal form 5) and without change in appearance.

Example 3

In order to test the stability of a suspension of cortisone acetate in combined vehicles A and B, prepared as described in Example 1, samples of this suspension were subjected to intermittent storage for 24 hours at 40° C. and 10° C. over a period of one week. During this storage period no change occurred in the appearance of the suspension, and there was no change in the crystal form (form 5). The particle size distribution before and after the test period was as follows:

|  | Before Test | After Test |
| --- | --- | --- |
|  | Percent | Percent |
| 0–5 microns | 85 | 86 |
| 0–10 microns | 98 | 97 |
| 0–20 microns | 100 | 100 |

Example 4

Two sterile aqueous vehicles, designated as A and B respectively and having the following compositions, were prepared:

|  | Aqueous Vehicle | |
| --- | --- | --- |
|  | A | B |
| Tween 80_____gm__ | 0.4 |  |
| Sodium Carboxymethylcellulose (Low viscosity)___gm__ | 0.5 | 0.5 |
| Benzyl Alcohol_____gm__ | 1.5 | 1.5 |
| Sodium Chloride_____gm__ | 0.9 | 0.9 |
| Distilled Water, to make_____cc__ | 100.0 | 100.0 |

200 gms. of sterile cortisone acetate (which was determined by X-ray analysis to have unstable crystal form 3) was transferred to a sterile 6 liter Pyrex bacteria grinding jar approximately ⅓ full of sterile 6 mm., solid Pyrex beads. 128 cc. of sterile aqueous vehicle A together with 2000 cc. of sterile aqueous vehicle B was added to the grinding jar, and approximately 0.5 cc. of a sterile seed-suspension of cortisone acetate, having crystalline form 5, was added. The grinding jar was aseptically stoppered and was rolled on its side for a total of 6 hours. During this period there was a reduction in particle size and a conversion from crystal form 3 (solid) to the stable crystal form 5 (in suspension). At the end of 6 hours of milling, the particle size distribution was as follows:

0–10 microns equals 99% by number
0–50 microns equals 100% by number

The primary mixture was aseptically separated from the beads and was diluted with a sufficient volume of sterile aqueous vehicle B to bring the total volume of the suspension to 8000 cc. Each cc. of this suspension contained 25 mg. of cortisone acetate. When this suspension was stored, no change in crystal form or appearance of the suspension occurred.

Example 5

Cortisone acetate_____gm__ 5.0
Sodium chloride_____gm__ 0.9
Sodium carboxymethylcellulose_____gm__ 0.5
Benzalkonium chloride solution [1]
 (1:5000)_____cc__ 100.0

[1] High molecular alkyl-dimethyl-benzyl-ammonium chloride.

The sodium chloride and sodium carboxymethylcellulose were dissolved in the benzalkonium chloride solution. The cortisone acetate was weighed and added to a glass bottle approximately one-fourth full of solid 6 mm. Pyrex glass beads. The aqueous solution was added. The bottle was sealed and was rolled on its side on mechanical rollers for 18 hours. The milled mixture was separated from the beads by draining on a perforated plate of a Büchner funnel. This suspension contained approximately 50 mg. cortisone acetate per cc., was fluid, free of lumps and failed to cake on standing.

*Example 6*

| | |
|---|---|
| Cortisone acetate _____gm__ | 5.0 |
| Sodium chloride _____gm__ | 0.9 |
| Sodium carboxymethylcellulose____gm__ | 0.5 |
| Benzyl alcohol _____gm__ | 1.5 |
| Cetyl trimethylammonium bromide__gm__ | 0.02 |
| Distilled water _____cc__ | 100.0 |

The sodium chloride, sodium carboxymethylcellulose, benzyl alcohol and cetyl trimethylammonium bromide were dissolved in the distilled water. The suspension was prepared as described in Example 5 to produce a suspension of cortisone acetate which was fluid, free of lumps, and which failed to cake on standing.

*Example 7*

| | |
|---|---|
| Cortisone acetate _____gm__ | 5.0 |
| Sodium chloride _____gm__ | 0.9 |
| Sodium carboxymethylcellulose____gm__ | 0.5 |
| Phenol _____gm__ | 0.5 |
| Sodium lauryl sulfate _____gm__ | 0.01 |
| Distilled water _____cc__ | 100.0 |

The sodium chloride, sodium carboxymethylcellulose, phenol and sodium lauryl sulfate were dissolved in the distilled water. The suspension was prepared as described in Example 5 to produce a suspension of cortisone acetate which was fluid, free of lumps, and which failed to cake on standing.

*Example 8*

| | |
|---|---|
| Cortisone acetate _____gm__ | 5.0 |
| Sodium chloride _____gm__ | 0.9 |
| Sodium carboxymethylcellulose____gm__ | 0.5 |
| Phenol _____gm__ | 0.5 |
| Sodium dehydrocholate _____gm__ | 1.0 |
| Distilled water _____cc__ | 100.0 |

The sodium chloride, sodium carboxymethylcellulose, phenol and sodium dehydrocholate were dissolved in the distilled water. The suspension was prepared as described under Example 5. The resulting suspension was fluid, free of lumps, and failed to cake on standing.

*Example 9*

| | |
|---|---|
| Cortisone acetate _____ | 5.0 gm. |
| Benzyl alcohol _____ | 1.5 gm. |
| Sodium citrate, dihydrate _____ | 1.47 gm. |
| N/10 hydrochloric acid_ | A sufficient quantity. |
| Sodium lauryl sulfate __ | 0.01 gm. |
| Distilled water _____ | 100.0 cc. |

The sodium citrate, benzyl alcohol and sodium lauryl sulfate were dissolved in the distilled water. A sufficient quantity of N/10 hydrochloric acid was added to adjust the pH to 6.5. The suspension was prepared as described in Example 5. The resulting suspension was fluid, free of lumps, and failed to cake on standing.

Various changes and modifications may be made in carrying out the present invention without departing from the spirit and scope thereof. Insofar as these changes and modifications are within the purview of the annexed claims, they are to be considered as part of my invention.

I claim:

1. A process for the preparation of a stable, non-caking aqueous suspension of cortisone acetate adapted for parenteral administration which comprises milling together an isotonic aqueous vehicle and a crystal form of cortisone acetate unstable in contact with said vehicle thereby converting the cortisone acetate into a crystal form stable in contact with said vehicle and reducing the particle size of the resulting crystals.

2. A process for the preparation of a stable, non-caking aqueous suspension of cortisone acetate adapted for parenteral administration which comprises milling together an isotonic aqueous vehicle containing a surface active agent, a suspending agent, and a bacteriological preservative, and a crystal form of cortisone acetate unstable in contact with said vehicle thereby converting the cortisone acetate into a crystal form stable in contact with said vehicle and reducing the particle size of the resulting crystals.

3. A pharmaceutical composition suitable for parenteral administration comprising a stable, non-caking suspension of cortisone acetate in an isotonic aqueous mixture comprising a surface active agent, a suspending agent and a bacteriological preservative, said cortisone acetate being in the form of crystals characterized by the following X-ray diffraction data:

| Interplanar Spacing, Å. | $2\theta$ (CuK$\alpha$), degrees |
|---|---|
| 15.5 | 5.7–6.0 |
| 8.65 | |
| 5.94 | 14.9–15.1 |
| 5.64 | 15.7–15.9 |
| 5.01 | 17.7–18.0 |
| 4.78 | |
| 4.68 | |
| 4.41 | |
| 4.15 | |
| 4.09 | |
| 3.95 | |
| 3.82 | |

4. A pharmaceutical composition suitable for parenteral administration comprising a stable, non-caking suspension of cortisone acetate in an aqueous mixture comprising the polyoxyalkylene derivative of sorbitan monooleate, sodium carboxymethylcellulose, benzyl alcohol, and sodium chloride, said cortisone acetate being in the form of crystals, 90% of which have a particle size between 0 and 10 microns in length, and characterized by the following X-ray diffraction data:

| Interplanar Spacing, Å. | $2\theta$ (CuK$\alpha$) degrees |
|---|---|
| 15.5 | 5.7–6.0 |
| 8.65 | |
| 5.94 | 14.9–15.1 |
| 5.64 | 15.7–15.9 |
| 5.01 | 17.7–18.0 |
| 4.78 | |
| 4.68 | |
| 4.41 | |
| 4.15 | |
| 4.09 | |
| 3.95 | |
| 3.82 | |

5. A non-caking suspension of cortisone acetate in an aqueous vehicle comprising a mixture of said vehicle and cortisone acetate, said cortisone acetate being in the form of crystals, 90% of which have a particle size between 0 to 10 microns in length, and characterized by the following X-ray diffraction data:

| Interplanar Spacing, Å. | 2θ (CuKα), degrees |
|---|---|
| 15.5 | 5.7–6.0 |
| 8.65 | 14.9–15.1 |
| 5.94 | 15.7–15.9 |
| 5.64 | 17.7–18.0 |
| 5.01 | |
| 4.78 | |
| 4.68 | |
| 4.41 | |
| 4.15 | |
| 4.09 | |
| 3.95 | |
| 3.82 | |

6. The process of preparing a stable non-caking suspension of cortisone acetate in an aqueous vehicle starting with the dry crystal form of cortisone acetate characterized as being stable in the dry state and unstable in contact with aqueous mediums and further characterized by the following X-ray diffraction data:

| Interplanar Spacing, Å. | 2θ (CuKα), degrees |
|---|---|
| 13.6 | 6.5 |
| 6.80 | 13.0 |
| 5.82 | 15.2 |
| 5.56 | 15.9 |
| 5.14 | |
| 4.92 | 19.7 |
| 4.50 | 20.4 |
| 4.35 | |
| 4.21 | |
| 3.88 | | which comprises bringing said dry crystal form of cortisone acetate into intimate contact with said aqueous vehicle and allowing the mixture to stand thereby converting said dry crystal form of cortisone acetate to the crystal form of cortisone acetate stable in contact with an aqueous medium and having the following X-ray diffraction data:

| Interplanar Spacing, Å. | 2θ (CuKα), degrees |
|---|---|
| 15.5 | 5.7–6.0 |
| 8.65 | 14.9–15.1 |
| 5.94 | 15.7–15.9 |
| 5.64 | 17.7–18.0 |
| 5.01 | |
| 4.78 | |
| 4.68 | |
| 4.41 | |
| 4.15 | |
| 4.09 | |
| 3.95 | |
| 3.82 | | and subjecting the resulting mixture to a grinding operation.

7. The process of preparing a stable, non-caking aqueous suspension of cortisone acetate adapted for parenteral administration starting with the crystal form of cortisone acetate characterized as being stable in the dry state and unstable in contact with aqueous mediums and further characterized by the following X-ray diffraction data:

| Interplanar Spacing, Å. | 2θ (CuKα), degrees |
|---|---|
| 13.6 | 6.5 |
| 6.80 | 13.0 |
| 5.82 | 15.2 |
| 5.56 | 15.9 |
| 5.14 | |
| 4.92 | 19.7 |
| 4.50 | 20.4 |
| 4.35 | |
| 4.21 | |
| 3.88 | | which comprises bringing said dry crystal form of cortisone acetate into intimate contact with an isotonic aqueous vehicle containing the polyoxyalkylene derivative of sorbitan monooleate, sodium carboxy methyl cellulose, benzyl alcohol and sodium chloride, subjecting the resulting aqueous suspension to a grinding operation thereby simultaneously converting the crystal form of cortisone acetate stable in the dry state to the crystal form of cortisone acetate characterized as being stable in contact with aqueous vehicles and further characterized by the following X-ray diffraction data:

| Interplanar Spacing, Å. | 2θ (CuKα), degrees |
|---|---|
| 15.5 | 5.7–6.0 |
| 8.65 | 14.9–15.1 |
| 5.94 | 15.7–15.9 |
| 5.64 | 17.7–18.0 |
| 5.01 | |
| 4.78 | |
| 4.68 | |
| 4.41 | |
| 4.15 | |
| 4.09 | |
| 3.95 | |
| 3.82 | | and, at the same time, reducing the particle size of the cortisone acetate crystals thus produced, and continuing said grinding operation until the particle size of 90% of said cortisone acetate crystals is between 0 and 10 microns in length.

THOMAS J. MACEK.

References Cited in the file of this patent

UNITED STATES PATENTS

| Number | Name | Date |
|---|---|---|
| 2,394,628 | Meyer | Feb. 12, 1946 |
| 2,417,299 | Freedman | Mar. 11, 1947 |
| 2,472,640 | Wilcox | June 7, 1949 |
| 2,492,189 | Sarett | Dec. 27, 1949 |

FOREIGN PATENTS

| Number | Country | Date |
|---|---|---|
| 469,089 | Great Britain | Sept. 30, 1935 |
| 515,566 | Great Britain | Dec. 8, 1939 |
| 543,897 | Great Britain | Mar. 18, 1942 |
| 225,886 | Switzerland | June 16, 1943 |

OTHER REFERENCES

Friedman in J. Lab. & Clin. Med., May of 1944.

Kendall on Cortisone in Chem. and Eng. News, June 19, 1950, volume 28, pages 2074 to 2078.

Boland on Cortisone Acetate in J. A. M. A., October 1, 1949, volume 141, pages 301 to 308.